INVENTOR.
WILLIAM E. KLUND

INVENTOR.
WILLIAM E. KLUND

United States Patent Office

3,311,869
Patented Mar. 28, 1967

3,311,869
SIMULTANEOUS PREFORMED BEAM TRANS-
MITTING TRANSDUCER SYSTEM
William E. Klund, San Diego, Calif., assignor to the
United States of America as represented by the Secretary of the Navy
Filed Apr. 21, 1965, Ser. No. 449,903
7 Claims. (Cl. 340—5)

The invention described herein may be manufactured and used by or for the Government of the United States of America for governmental purposes without the payment of any royalties thereon or therefor.

This invention relates to transducer systems and is particularly directed to means for simultaneously transmitting more than one directional beam from an array of transducer elements.

Heretofore, transmitting transducers have been constructed so as to provide at any instant of time a single transmitting beam which contains the signal from a single source. Unfortunately, if energy is to be transmitted in several directions, a sequential time-consuming transmitting schedule must be used when different information is transmitted in the different directions.

The object of this invention is to provide an improved transmitting transducer array system.

A more specific object of this invention is to provide a transducer transmitting system in which the processing time of each beam available to a receiver is maximized while the total transmitting time is minimized.

The objects of this invention are attained by an array of transducers capable of transmitting simultaneously any number of controllable preformed beams. Each beam operates independently of the other beams and has a signal content derived from a separate signal source. The system contains a group of signal generators and beam forming networks equal in number to the number of beams to be transmitted. Each discrete time delayed signal component emerging from a single beam forming network is amplified in a linear amplifier and is applied to a single linear transducer element whose output is firmly controlled by its input, through a linear summing network in which the several components of different beam forming networks may be added or superimposed without intermodulation action. A relatively narrow beam, at any angle $\theta$ may be identified with a unique signal source.

Figure 1:
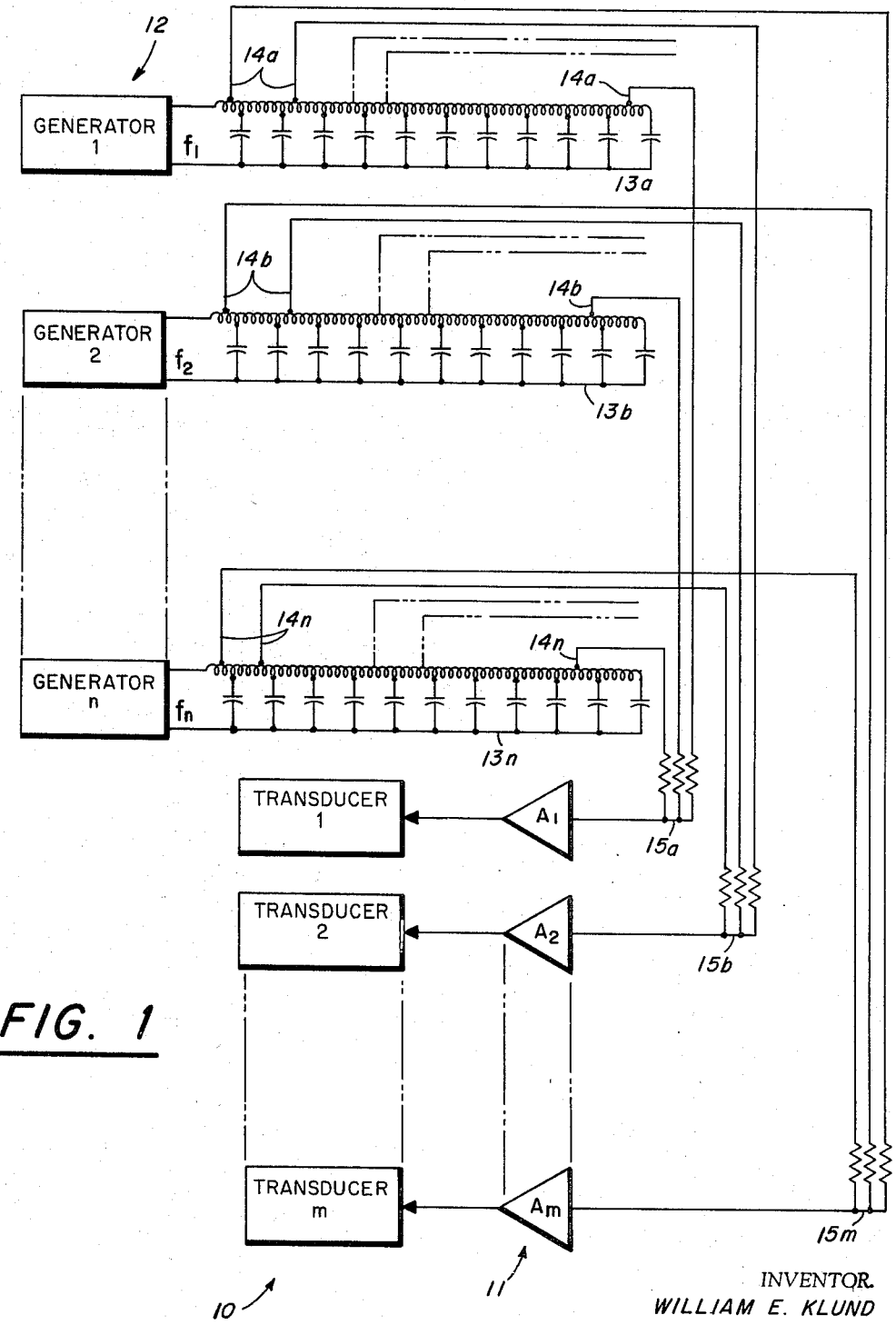
Figure 2:
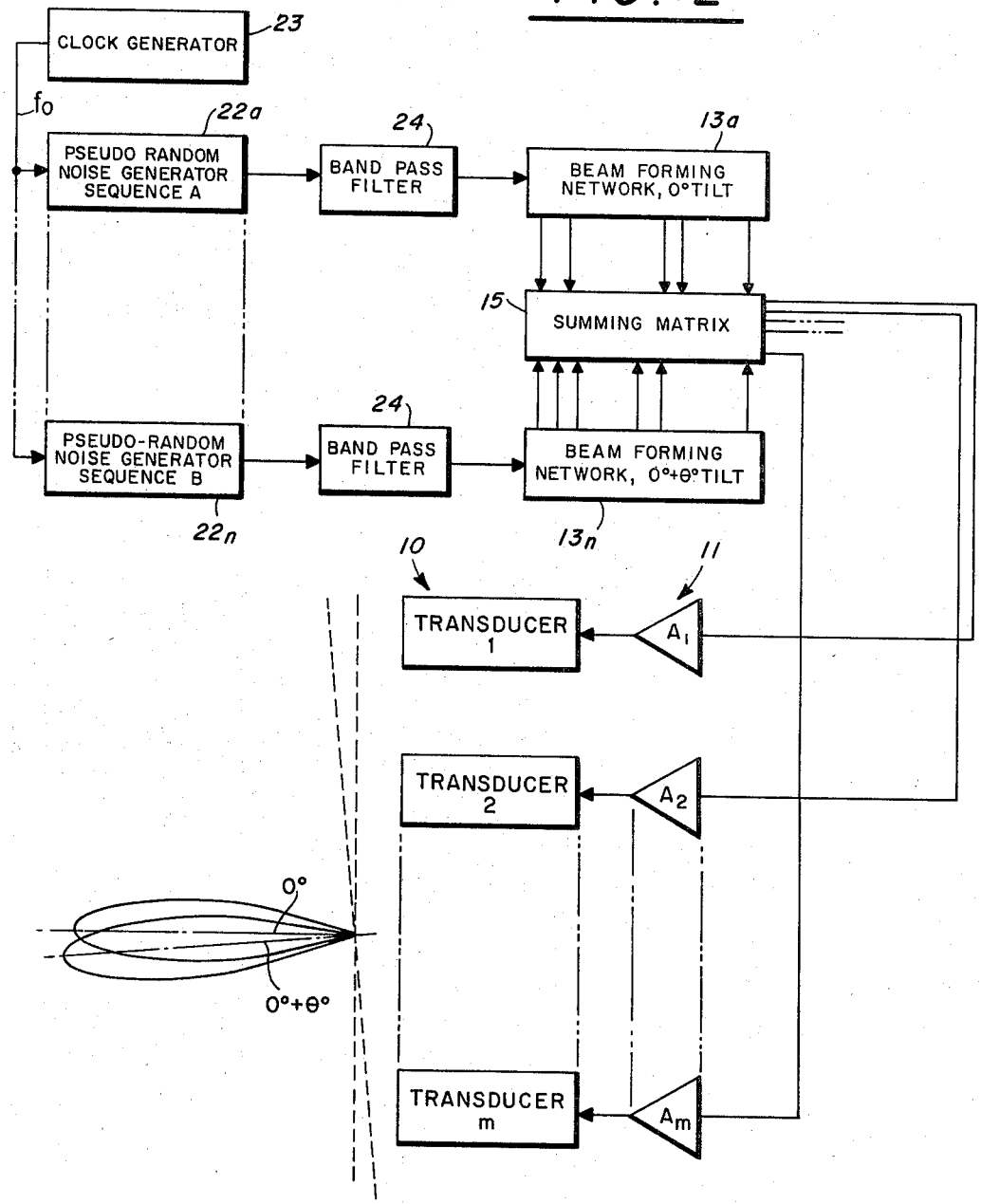

Other objects and features of this invention will become apparent to those skilled in the art by referring to the specific embodiments described in the following specification and shown in the accompanying drawing in which:

FIG. 1 is a schematic circuit diagram of the preferred embodiment of this invention; and FIG. 2 is a modification, in block diagram, of the invention of the system of FIG. 1.

The array 10, FIG. 1, of transducers may comprise any number of transducing elements numbered from 1 to $m$. The transducers may be arranged in a plane or in any other suitable array configuration. Amplifiers 11, numbered 1 to $m$, individually drive their respective transducers. It is important that the amplifiers be linear over a wide range of signal amplitudes and that they introduce minimum phase distortion. The face velocity of the transducing elements in an acoustic system must faithfully follow the waveforms applied to the amplifier inputs. It is apparent that if the transducers, in planar array, are all actuated in identical phase and amplitude the wave front and hence the resultant beam will be normal to the array plane. If, however, the phase or time delay of the signal to each transducer element is progressively increased with respect to the phase or time delay of the signal applied to the next adjacent element in one dimension the wave front will be tilted at an angle to the normal. The amount of tilt is determined by the amount of phase displacement or time delay, the array dimensions, and the velocity of propagation. Ensonification of large bodies of fresh or salt water is contemplated.

At 12 is shown a set of $n$ signal generators, a number corresponding to the number of discrete beams to be radiated from the transducer array. Each generator in the embodiment of FIG. 1 is distinguished by a discrete waveform which is different from the waveforms of the other generators. For example, the generators may produce sinusoidal waveforms which differ in frequency by 500 cycles per second in the 4,000 to 5,000 cycle per second band.

The particular beam forming networks 13 contemplated in FIG. 1 are a group of tapped delay lines, one connected to the output of each of the generators 12. Each of the networks 13 may comprise a real or artificial transmission line designed to introduce time delay. Alternatively, the delay mechanism may be of other form, for instance, a chain of lumped constant filter sections as shown. Since the delay per section of the filter is a function of the series inductance and shunt capacity, it is possible to design a line from which can be tapped an entire series of differently delayed waves. The taps 14 are so placed along the delay line 13 as to produce at the faces of the transducing elements a group of time related sonic waves which will reinforce each other in a specific spatial direction. This is beam forming. The taps 14a on line 13a are, for example, so related as to produce a beam at angle $\theta_1$ from the normal to the array whereas the taps 14b on line 13b are so related as to produce a beam at an angle $\theta_2$ from the array normal.

Linear summing networks 15a, 15b, and 15m are connected between each power amplifier 11, respectively, and the beam forming networks 13. Conveniently, the taps on the delay lines are connected through isolating resistors connected at one end to a common bus bar which comprises the input of the amplifiers. Since there is linear addition or superposition of signals at the bus bar and there is linear amplification of all input signals to the amplifier, the acoustic output of each transducer contains undistorted, the waveform of each operating signal, say for instance, frequency $f_1$ to $f_n$ of generators 12. Further, the signal arising from each generator is specific to one beam direction. In operation, all of the generators 22 of frequencies $f_1$ to $f_n$ may be operated simultaneously so that the beams from the array ensonify the water environment simultaneously. It would be simple, of course, to group the generators and to switch them on and off in groups to ensonify certain selected sectors of the water environment.

Whereas, in FIG. 1, each beam is identified by its frequency $f_1$ to $f_n$, the beams may, if desired, occupy a common frequency band and be identified by a unique coded instantaneous frequency variation such as that of a pseudo-random noise sequence. In FIG. 2 the signal sources comprise pseudo-random noise generators 22a to 22n. For convenience, all noise generators are operated at the same clock frequency, from clock generator 23. The generators 22 are of conventional type comprising a series of cascaded binary stages with a modulo-2 feedback loop. Each generator produces a different but unique sequence of ones and zeros in the output circuit of the generator. The clock frequency could, for example, be ten kilocycles per second, so that the noise-like band has an essentially flat spectrum out to 5 kilocycles per second. As well known in the art, the output of each generator can be identified by a correlation receiver having knowledge of the particular sequence invloved. The rather broad frequency spectrum of the output of generators 22 may be limited by bandpass filters 24. If the filter center frequency is taken as 4500 cycles per second the bandwidth of the bandpass filters 24 could be of the order of 1000 cycles per second. The output of each filter is applied to the input of the delay line 13. From judiciously placed taps along the delay line, the time delayed components are taken corresponding to a specific beam direction. The multi-beam components for each transducer element are summed in the linear summing matrix 15 and, as in FIG. 1, are applied to the power amplifiers 11 and transducers 10. In operation, hence, each discrete beam is identified by the specific sequence of one of the generators 22a to 22n.

In many situations, the simultaneous transmission performance of the system of FIGS. 1 and 2 is equivalent to the performance which would have been obtained by transmitting the various beams sequentially with the same total transmission time and the same expenditure of total radiated energy. Consider, now a situation in which the receiver of such signals is limited in performance by resolvable multi-path arrivals rather than by incoherent background noise. Reverberation from top and bottom ocean boundaries can fit this case for broad band transmitted signals. If two beams can be transmitted as in this invention, simultaneous transmission yields double the available pulse length for a given total transmission time. If reverberation, for example, is the limiting factor on the receiver signal-to-noise ratio output, the simultaneous beam transmission system of this invention will yield a gain of 3 db in receiver output signal-to-noise ratio compared to a sequential beam transmission system having the same total transmission time and energy.

What is claimed is:

1. A transmitting transducer system for transmitting simultaneously a plurality of differently oriented directional beams, said system comprising;
   an array of transducer elements,
   a plurality of unique signal sources corresponding in number to the number of said directional beams to be radiated by said array,
   a beam forming network coupled to each signal source, each network having a plurality of output terminals for producing a series of time shifted signal components of the connected signal source which when applied, respectively, to predetermined transducer elements will generate one of said beams, and
   means for applying said series of time shifted signal components, respectively, to said transducer elements.

2. In the transducer system defined in claim 1, said signal sources comprising generators of different frequencies.

3. In the transmitting transducer system defined in claim 1, said signal sources comprising pseudo-random noise generators with, respectively, different coded sequences.

4. In the transmitting system defined in claim 1, said signal sources comprising generators with different waveforms.

5. In the transmitting transducer system defined in claim 1;
   a linear power amplifier connected to the input of each transducer element,
   a linear summing network connected between the input of each amplifier and the outputs of different time-delay networks.

6. In the transducer system defined in claim 1, said beam forming network comprising a transmission line composed of lumped parameter circuit elements having taps at selected points along the delay line corresponding to the desired time relationship of said signal components.

7. In the transducer system defined in claim 1, said network comprising phase shifting elements having outputs corresponding to the desired phase relationship of said signal components.

References Cited by the Examiner

UNITED STATES PATENTS

| | | | |
|---|---|---|---|
| 2,408,436 | 10/1946 | Mason | 340—6 X |
| 2,786,193 | 3/1957 | Rich | 340—6 |
| 2,810,905 | 10/1957 | Barlow | 343—100 |
| 3,039,094 | 6/1962 | Anderson | 340—6 X |
| 3,042,916 | 7/1962 | Clarke | 343—100 |
| 3,158,830 | 11/1964 | Clay | 340—3 |
| 3,222,677 | 12/1965 | Fink | 343—100 |
| 3,226,724 | 12/1965 | Brueckmann | 343—853 |
| 3,255,450 | 6/1966 | Butler | 343—100 |

OTHER REFERENCES

Butler et al.: "Beam-Forming Matrix Simplifies Design of Electronically Scanned Antennas," Electronic Design, Apr. 12, 1961, pp. 170–173 relied on.

CHESTER L. JUSTUS, *Primary Examiner.*

RODNEY D. BENNETT, *Examiner.*

R. A. FARLEY, *Assistant Examiner.*